US008615747B2

(12) United States Patent
Beretta (10) Patent No.: US 8,615,747 B2
(45) Date of Patent: Dec. 24, 2013

(54) METHOD AND APPARATUS FOR DYNAMIC CODE OPTIMIZATION

(75) Inventor: Robert Beretta, South Lake Tahoe, CA (US)

(73) Assignee: Apple Inc., Cupertino, CA (US)

( * ) Notice: Subject to any disclaimer, the term of this patent is extended or adjusted under 35 U.S.C. 154(b) by 1522 days.

(21) Appl. No.: 11/788,061

(22) Filed: Apr. 18, 2007

(65) Prior Publication Data
US 2008/0263529 A1 Oct. 23, 2008

(51) Int. Cl.
*G06F 9/45* (2006.01)
(52) U.S. Cl.
USPC ............ 717/151; 717/136; 717/140; 717/146
(58) Field of Classification Search
None
See application file for complete search history.

(56) References Cited

U.S. PATENT DOCUMENTS

| | | | | |
|---|---|---|---|---|
| 6,029,207 | A * | 2/2000 | Heninger | 719/331 |
| 6,341,371 | B1 * | 1/2002 | Tandri | 717/158 |
| 7,818,729 | B1 * | 10/2010 | Plum et al. | 717/140 |
| 8,069,440 | B2 * | 11/2011 | Tirumalai et al. | 717/151 |
| 8,122,441 | B2 * | 2/2012 | Barsness et al. | 717/146 |
| 8,196,125 | B2 * | 6/2012 | Maes | 717/151 |
| 2002/0066086 | A1 * | 5/2002 | Linden | 717/145 |
| 2004/0098713 | A1 * | 5/2004 | Ogawa et al. | 717/160 |
| 2004/0143822 | A1 * | 7/2004 | Jager et al. | 717/140 |
| 2005/0039196 | A1 * | 2/2005 | Sasidharan | 719/331 |
| 2005/0231502 | A1 * | 10/2005 | Harper et al. | 345/418 |
| 2006/0236310 | A1 * | 10/2006 | Domeika et al. | 717/140 |
| 2006/0259897 | A1 * | 11/2006 | Zorn et al. | 717/118 |
| 2008/0127134 | A1 * | 5/2008 | Tirumalai et al. | 717/140 |
| 2009/0077543 | A1 * | 3/2009 | Siskind et al. | 717/136 |

OTHER PUBLICATIONS

K. Kumar, When and What to Compile/Optimize in a Virtual Machine?, Mar. 2004, 8 pages.*
Veldema et al., Runtime Optimizations for a Java DSM Implementation, 2001, 10 pages.*
Chris Lattner, "The LLVM Compiler System", 2007 Bossa Conference on Open Source, Mobile Internet and Multimedia, Recife, Brazil, Mar. 2007.

* cited by examiner

*Primary Examiner* — Thuy Dao
(74) *Attorney, Agent, or Firm* — Blakely, Sokoloff, Taylor & Zafman LLP (57) ABSTRACT

A method and an apparatus that optimally compile a source code for a data transformation operation in response to a request from a run-time application are described. A current state of the run-time application is included in the request. The application executes a non-optimized library routine for the data transformation operation while a separate worker thread performs optimized code compilation on the source code for the data transformation operation based on the request at the same time. The request includes a current state of the run-time application. The non-optimized library routine has been pre-built during build time.

22 Claims, 7 Drawing Sheets

METHOD AND APPARATUS FOR DYNAMIC CODE OPTIMIZATION

FIELD OF INVENTION

The present invention relates generally to code optimization. More particularly, this invention relates to compiling optimized code during run time.

BACKGROUND

As the complexity of software applications increases, the significance of an optimized library serving commonly used operations called from an application has become more and more important. For example, users may demand a faster rendering speed to support high resolution or near life graphic effects when playing an interactive computer game. Usually, a static non-optimized code library is available for an application to link during link time. These static libraries are often built during build time. Most static libraries are not optimally compiled to consider run-time states from calling applications because such states are not available during build time. In some cases, there may be too many possible run-time states and hence it may be impractical to create optimally compiled library routines.

Although some library routines may be optimally compiled on request during run time, such optimizations are typically performed without regard to the number of times an optimized library routine will be called by an application. This is especially true for operations during application start up. However, optimized library routines for supporting application start up tasks may be called only once or twice in the entire application life cycle.

Therefore, computing resources spent for run-time code optimization may be wasted. Additionally, an application may take more time optimizing a run-time library code than directly executing a corresponding static version. As a result, users tend to experience glitches in overall system performance.

SUMMARY OF THE DESCRIPTION

An embodiment of the present invention includes methods and apparatuses that optimally compile a source code for a data transformation operation, or some other operations, in response to a request from a run-time application. A current state of the run-time application is included in the request. The application executes a non-optimized library routine for the data transformation operation, or some other operations, while a separate worker thread performs optimized code compilation on the source code for the data transformation operation, or some other operations, based on the request at the same time. The request includes a current state of the run-time application. The non-optimized library routine has been pre-built during build time. This allows the first and possibly a few subsequent requests to be executed through the use of the non-optimized library routine concurrently while the optimized code is being compiled, and once it is completed, the optimized code may be used for further requests for the particular operation.

In an alternative embodiment, a source code for a library routine is compiled into an intermediate binary code to be used for run time compiling. At run time, an element including a task key is retrieved from a queue to compile an optimized code for the library routine from the intermediate binary code to be stored in a dynamic library.

Other features of the present invention will be apparent from the accompanying drawings and from the detailed description that follows.

DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for dynamic code optimization are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a dynamic code optimization may be designed to provide a run-time compilation mechanism to gradually improve the performance of an application over time. Depending on how a user drives an application, the dynamic code optimization may build a dynamic compiled code library adapting to a usage pattern of the application. In one embodiment, compiling an optimized code into a dynamic code library during application run time using a worker thread may reduce the user experience that a running application stalls while compiling optimized code. The dynamic code library may include optimized routines more likely to be called repetitively for an application. Thereby, the longer or the more times a user operates an application, the better the application performs.

Figure 1:
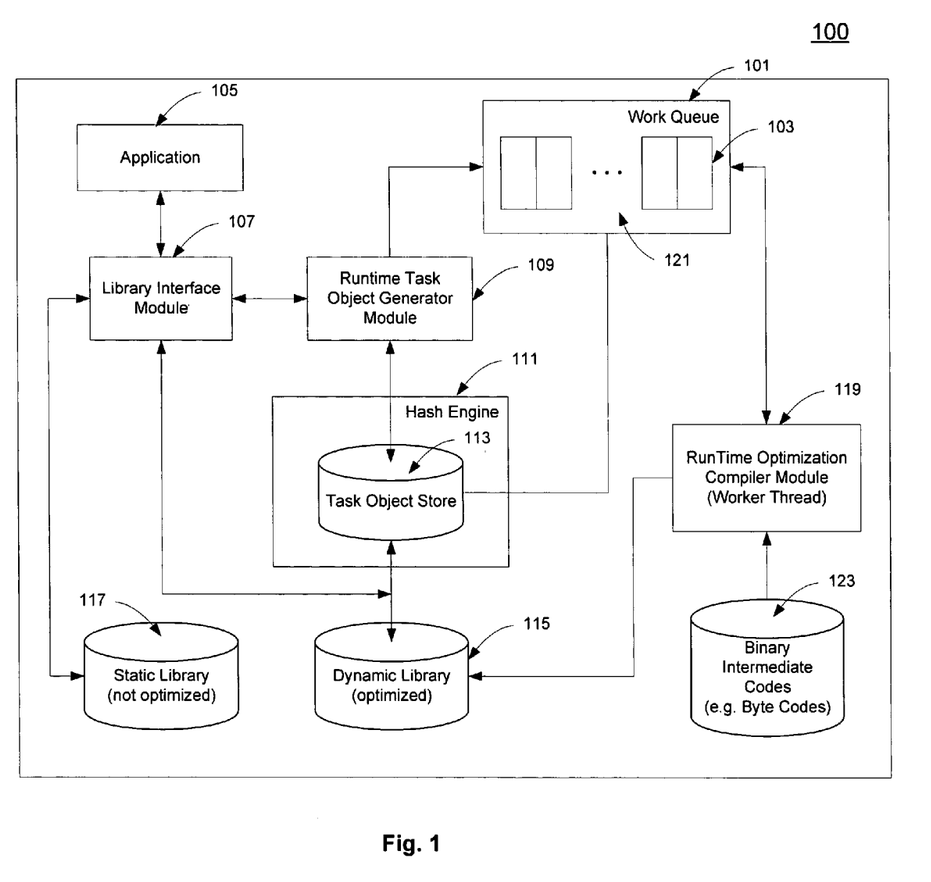
FIG. 1 is a block diagram illustrating one embodiment of a system for dynamic code optimization.

FIG. 1 is a block diagram illustrating one embodiment of a system for dynamic code optimization. In one embodiment, system 100 may be a computer operating environment including a running application 105 such as a computer game or a graphic animation program. Application 105 may be linked with a library interface module 107 to access library routines supporting, for example, API (application program interface) calls associated with the application 105. In one embodiment, the library interface module 107 may be coupled with a static library 117 including compiled codes for implementing library routines supported by the library interface module 107. Compiled codes inside the static library 117 may not be optimized. In one embodiment, a static library is built during build time and linked with an application during link time before the application is running.

Additionally, the library interface module 107 may be coupled with a dynamic library 115 via a hash engine 111. A dynamic library may be an optimized executable code storage as a container for executable codes dynamically modified. A library routine in the dynamic library 115 may be compiled after an application calls a library function corresponding to the library routine via, for example, the library interface module 107. In one embodiment, a library routine in the dynamic library 115 includes optimally compiled codes based on a request from a run-time application, such as application 105. The request may include a function name and a plurality of associated parameters, such as arguments or options for a function call. In one embodiment, application 105 may send a request for a library routine to the library interface module 107. The library interface module 107 may search for an optimized routine in the dynamic library 115 corresponding to a received request. The search may be based on a hash table of the hash engine 111 indexed according to requests from run-time applications, such as application 105.

According to one embodiment, the library interface module 107 may determine a task vector based on received requests to find a corresponding optimized library routine. The task vector may be a tightly packed bit vector representing a request from a run-time application. In one embodiment, the hash engine 111 may retrieve a run-time task object based on a task vector. The hash engine 111 may be associated with a task object store 113 including a plurality of run-time task objects. A run-time task object may include a pointer for optimally compiled codes inside the dynamic library 115. In one embodiment, the hash engine 111 may be coupled to the dynamic library 115 through pointers included in run-time task objects. A run-time task object may include a null pointer to indicate the corresponding optimized codes are not available in the dynamic library 115.

According to one embodiment, the library interface module 107 may call a run-time task object generator module 109 to generate a new run-time task object for a run-time request received from an application such as application 105. A new run-time task object may be generated when the library interface module 107 fails to find any run-time task object from the hash engine 111 according to a received run-time request. In one embodiment, the generator module 109 may update the hash engine 111 with a newly generated run-time task object, for example, into the object store 113 of the hash engine 111. The library interface module 107 may update a work queue 101 with a newly generated task object.

According to one embodiment, a plurality of run-time task objects may be queued in the work queue 101 to schedule tasks for compiling optimized codes, such as optimized codes for a plurality of different state vectors or run-time states. The work queue 101 may include a queue 121 with elements associated with a plurality of run-time task objects. Each associated run-time task object in the queue 121 may be stored in the run-time task store 113. The run-time task object associated with the head element 103 of the work queue 121 may be scheduled for the next optimized code compilation task. In one embodiment, the library interface module 107 may update the work queue 101 by adding or removing elements to the queue 103. In some embodiments, the library interface module 107 may reorder elements inside the queue 121.

In one embodiment, a run-time optimization compiler module 119 may run as a worker thread separately from threads running the application 105 in system 100. A worker thread, such as a pthread (POSIX thread), may have with its own stack while sharing its memory with other threads in the same process. In one embodiment, the run-time optimization compiler module 119 may perform code optimization according to a run time task object including a task vector. The order of the run-time code optimization tasks may be determined according to the queue 121 in the work queue 101. For example, compiler module 119 may retrieve the run-time task object associated with the head element of the queue 101 for a new code optimization task after finishing compiling an existing one. A run time object task retrieved by compiler module 119 may be removed from the work queue 101. In one embodiment, compiler module 119 may compile an optimized library routine from a binary intermediate representation of the source codes 123 into the dynamic library 115. A pointer of the run-time task object corresponding to an optimized library routine may be updated to point to the optimized library routine stored in the dynamic library 115.

Figure 2:
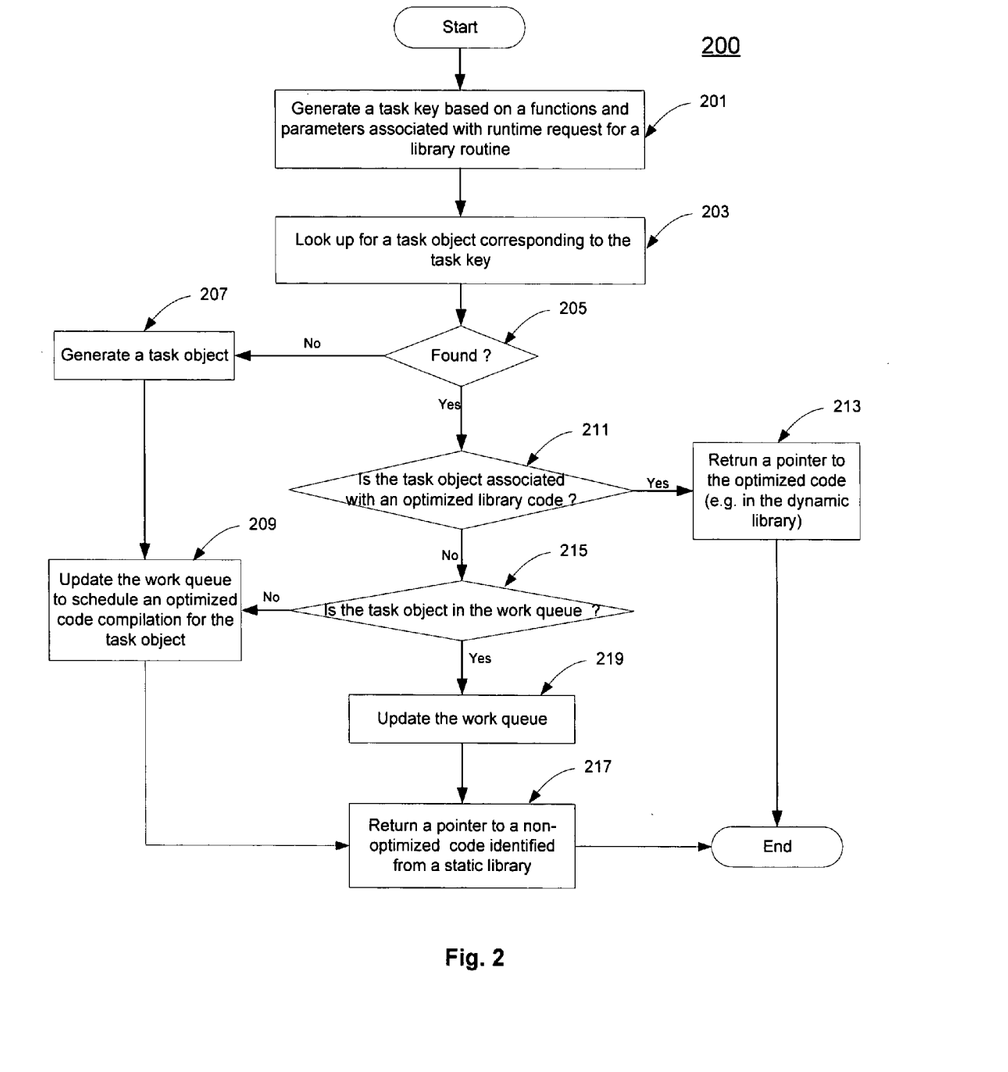
FIG. 2 is a flow diagram illustrating one embodiment of a process for dynamic code optimization.

FIG. 2 is a flow diagram illustrating one embodiment of a process for dynamic code optimization. Process 200 may be performed in the library interface module 107 of FIG. 1. In one embodiment, process 200 generates a task key at block 201 in response to a run-time request calling a library routine from an application, such as application 105 of FIG. 1. A task key may be associated with a current run-time state of a calling application, including library function names and function parameter values. Additionally, the task key may include state values previously set by functions in library interface 107 according to a state machine. In one embodiment, a task key may be represented by a binary state vector having a bit length indicative of the number of possible states. In one embodiment, library routines are predefined according to an analysis of a tradeoff between the optimization benefit and the size of a routine. Factors considered for the tradeoff may include the effectiveness of optimization, the size and the ease of use for each library routine. Usually, the larger the size of a library routine, the more effective the optimized compilation task will be; however, the harder it is for an application to use the library routine. In one embodiment, a library routine may be related to a graphics rendering operation such as an OpenGL (Open Graphic Library) API (Application Programming Interface). For example, a library routine may be associated with image transformation, vertex transformation, geometry transformation, pixel transformation or texture transformation.

Figure 3:
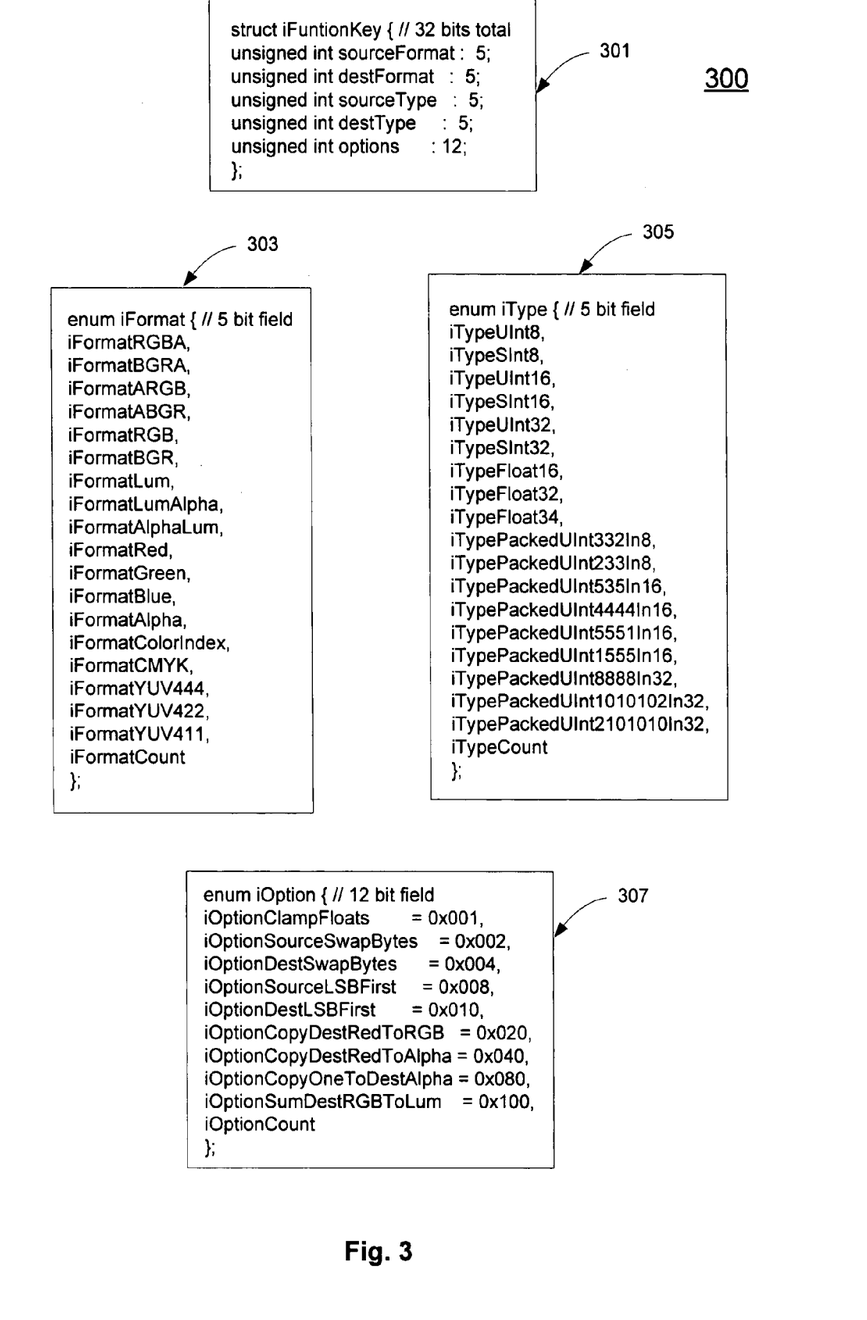
FIG. 3 illustrates an example of a task key for dynamic code optimization.

FIG. 3 illustrates an example of a task key for dynamic code optimization. Example 300 includes a 32 bit task key for an image transformation operation represented by a structure definition 301 according to, for example, a C programming language. The image transformation operation may be associated with a source image and a destination image. A variety of formats and types for both source and destination images may be specified for the operation as listed in example blocks 303 and 305. Additionally, the image transformation may be accompanied by a number of options as shown in the example block 307.

Referring back to FIG. 2, according to one embodiment, process 200 looks up for a task object corresponding to the task key at block 203. The task object may be a run-time task object. The lookup may be performed based on a hashing against the task key such as in hash engine 111 of FIG. 1. A hashing key may be generated from the task key based on a, for example, 7-bit or 8-bit cyclic add operation to identify a bucket in a hash table for matching the task key. At block 205, process 200 determines if a task object corresponding to the task key is found or not.

In one embodiment, a task object may be associated with a predefined set of states. For example, a task object may be in a queue state, a compiling state, a cancel state, or a finished state. A task object with a queue state may be scheduled for an optimized run-time compilation waiting in a queue such as work queue 101 of FIG. 1. A task object with a compiling state may be associated with a current optimized compilation task being performed by a run-time optimization compiler such as in 119 of FIG. 1. In one embodiment, a task object with a cancel state may have been removed from a queue previously scheduled for an optimized run-time compilation. A task object with a finished state may be associated with a pointer to an optimally compiled library routine for the corresponding task key.

At block 207, in one embodiment, process 200 may generate a new task object for the task key if process 200 fails to find a task object matching the task key at block 203. A task object generation may be performed by a module such as run-time task object generator module 109 of FIG. 1. Process 200 may schedule an optimized code compilation for the library routine corresponding to the task key for the newly generated task object by adding the new task object to a work queue, such as work queue 101 of FIG. 1, at block 209. In one embodiment, a newly generated task object may be assigned a default queue state after being added to a work queue. Process 200 may remove an existing task object from the work queue at block 209. Process 200 may identify a non-optimized library code according to the task object from the static library, such as library 117 of FIG. 1 at block 217 after updating the work queue at block 209. In one embodiment, process 200 may return a pointer to the identified non-optimized library code at block 217.

If a matching task object is found at block 205, according to one embodiment, process 200 may determine if the task object is associated with an optimized library code at block 211. The task object may be in a finished state when associated with an optimized library code. In one embodiment, a task object may include a pointer to the optimized library code in a dynamic library such as library 115 of FIG. 1. Process 200 may return a pointer to the associated optimized code at block 213. If the matching task object is not associated with an optimized library code, process 200 may check if the matching task object has already been scheduled in a work queue, e.g. in a queue state, at block 215. If the task object is already scheduled in the work queue, process 200 may proceed to update the work queue at block 219. In one embodiment, process 200 may change the order of scheduled optimized compilation tasks in the work queue at block 219, such as increasing the priority of the task object for the current request. In another embodiment, process 200 may keep the existing order of the work queue at block 219. Process 200 may return a pointer to a non-optimized library code at block 217 after updating the work queue at block 219. If the task object is not yet scheduled in the work queue, e.g. in a cancel state, process 200 may schedule an optimized compilation task for the matching task object at block 209 before executing a corresponding non-optimized library code at block 217. In one embodiment, process 200 returns to the calling application after identifying either an optimized library code at block 213 or non-optimized library codes at block 217.

Figure 4:
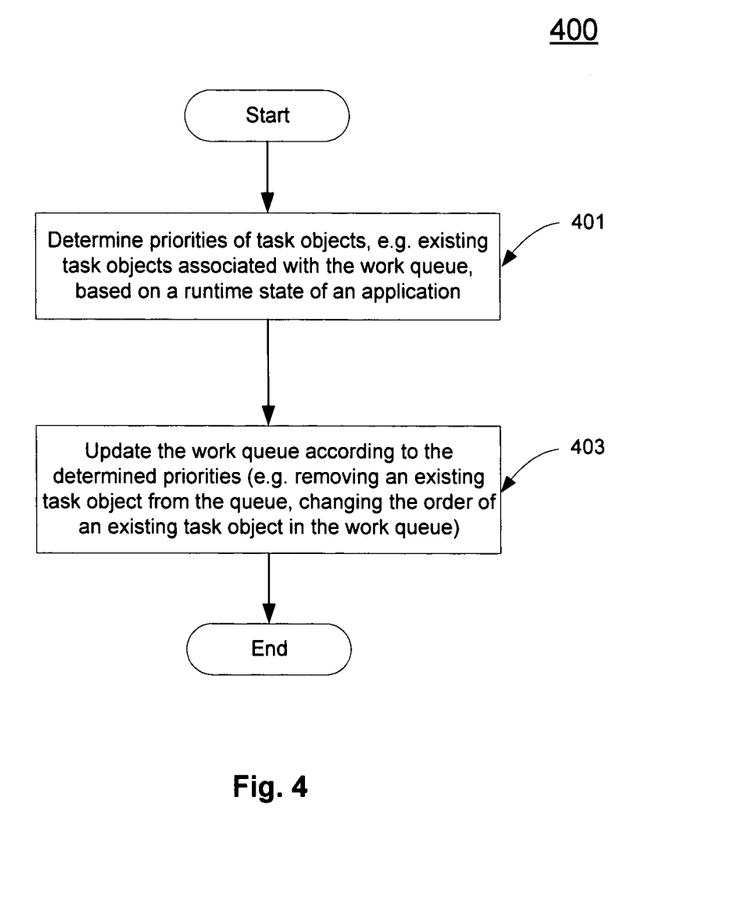
FIG. 4 is a flow diagram illustrating an embodiment of updating a work queue.

FIG. 4 is a flow diagram illustrating an embodiment of updating a work queue. Process 400 may be performed at block 209 or block 219 of FIG. 2. In one embodiment, process 400 may determine the priority of a task object, such as a newly generated task object to be scheduled in a work queue, e.g. work queue 101 of FIG. 1, at block 401. Process 400 may determine priorities of existing task objects associated with the work queue. In one embodiment, priorities of a task object may be determined based on a current running state of an application. For example, a graphic operation request for a new frame may have a higher priority than graphic operations related to previous frames. In one embodiment, an existing task object scheduled in a queue may have a higher priority than a newly generated task object. In another embodiment, the priority of a task object may depend on the number of times its associated request has been made by running applications.

At block 403, process 400 may update the work queue according priorities of task objects. In one embodiment, a newly generated task object may be scheduled by appending it to the tail of the work queue. Process 400 may remove (cancel) a task object associated with the tail element of the work queue to accommodate a newly generated task object. In one embodiment, process 400 may remove (cancel) a plurality of existing task objects from the work queue based on a change of state of a running application. For example, process 400 may remove existing task objects associated with graphic operations related to rendering previous frames when a new task object is generated by a current request for rendering a new frame. In one embodiment, process 400 may reorder task objects associated with a work queue at block 403 according to the priorities updated at block 401.

Figure 5:
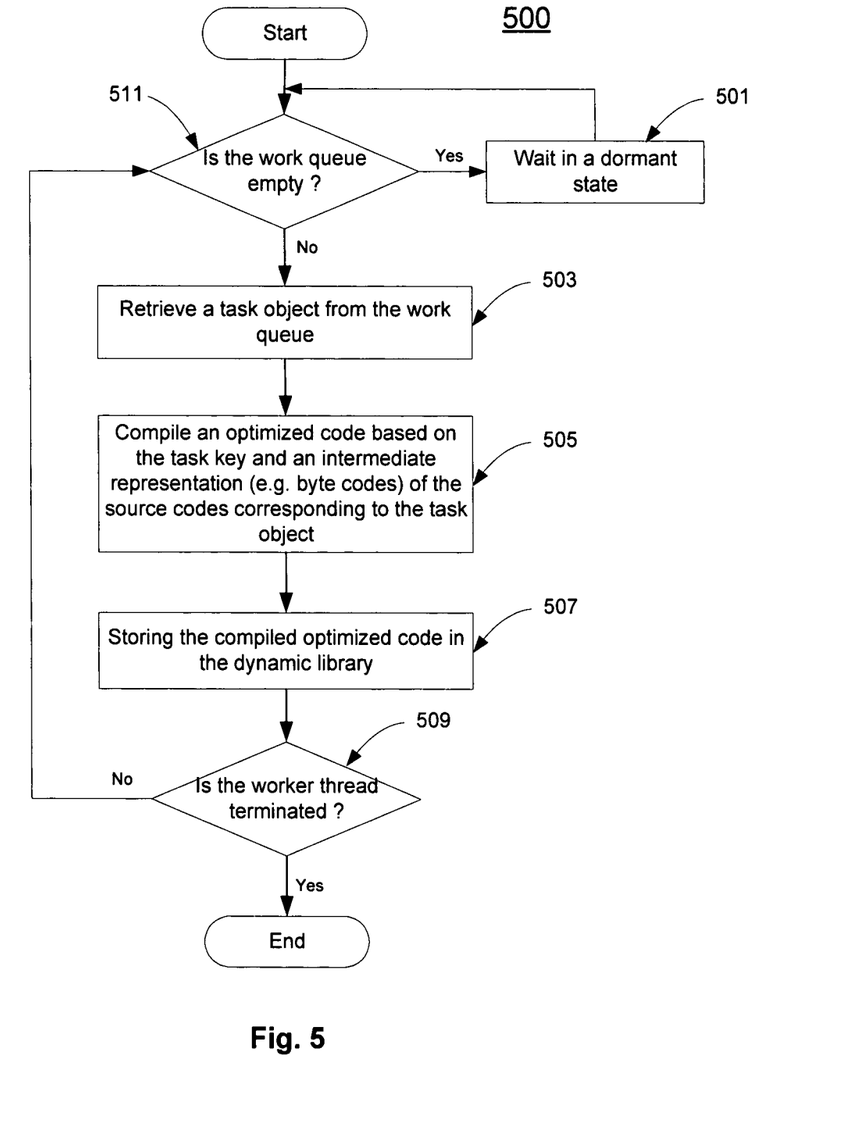
FIG. 5 is a flow diagram illustrating one embodiment of a worker thread compiling optimized code based on a work queue.

FIG. 5 is a flow diagram illustrating one embodiment of a worker thread compiling optimized code based on a work queue. Process 500 may be performed by compiler module 119 of FIG. 1 in a worker thread. In one embodiment, process 500 may wait in a dormant state at block 501 to be waken up periodically by a timer to check whether a work queue is empty at block 511. In another embodiment, process 500 at block 501 may be notified to check a work queue at block 511, such as when the work queue receives a task object. If the work queue is empty at block 511, process 500 may go back to a dormant state at block 501. Otherwise, process 500 may retrieve a task object, such as, for example the head task object, from the work quest at block 503. Process 500 may update the work queue by removing the retrieved task object from the work queue.

At block 505, process 500 may compile an optimized library code from the source codes corresponding to the task object. In one embodiment, the optimized library code is compiled from a binary intermediate representation of the source codes, such as binary intermediate codes 123 of FIG. 1, of the corresponding non-optimized static library, e.g. static library 117 of FIG. 1. The binary intermediate representation and the non-optimized static library may be based on the same source codes. In one embodiment, the optimized code compilation at block 505 may reduce code branches from the corresponding source codes based on the associated task key in the task object. Process 500 may store the compiled optimized library code into a dynamic library, such as library 115 of FIG. 1, at block 509. If the work thread running process 500 is not to be terminated, e.g. by system shutdown message, process 500 may continue at block 511 for additional compilation tasks scheduled in the work queue.

Figure 6:
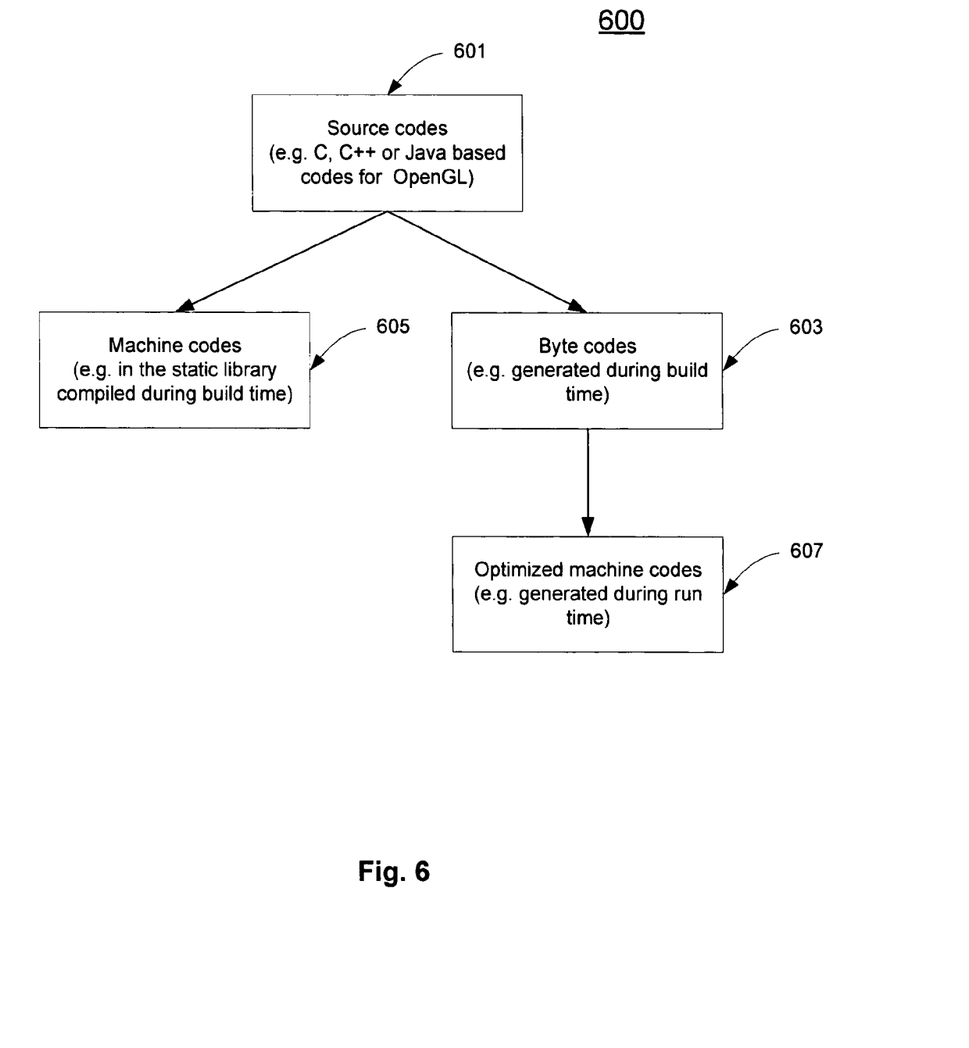
FIG. 6 is a block diagram illustrating one example of a static library and a dynamic library both compiled from the same source codes.

FIG. 6 is a block diagram illustrating one example of a static library and a dynamic library both compiled from the same source codes. Source codes 601 may be in a high level programming languages, such as C, C++ or Java. In one embodiment, source codes 601 may implement a graphic operation library such as OpenGL. Executable machine codes 605 may be compiled from source codes 601 during build time as a non-optimized static library. Byte codes 603 may be compiled before run time from source codes 601 as an intermediate binary representation of the corresponding source codes. In one embodiment, the intermediate binary representation is based on LLVM (Low Level Virtual Machine). Optimized machine codes 607 may be compiled from byte codes 603 during run time, e.g. in accordance with system 100 of FIG. 1.

Figure 7:
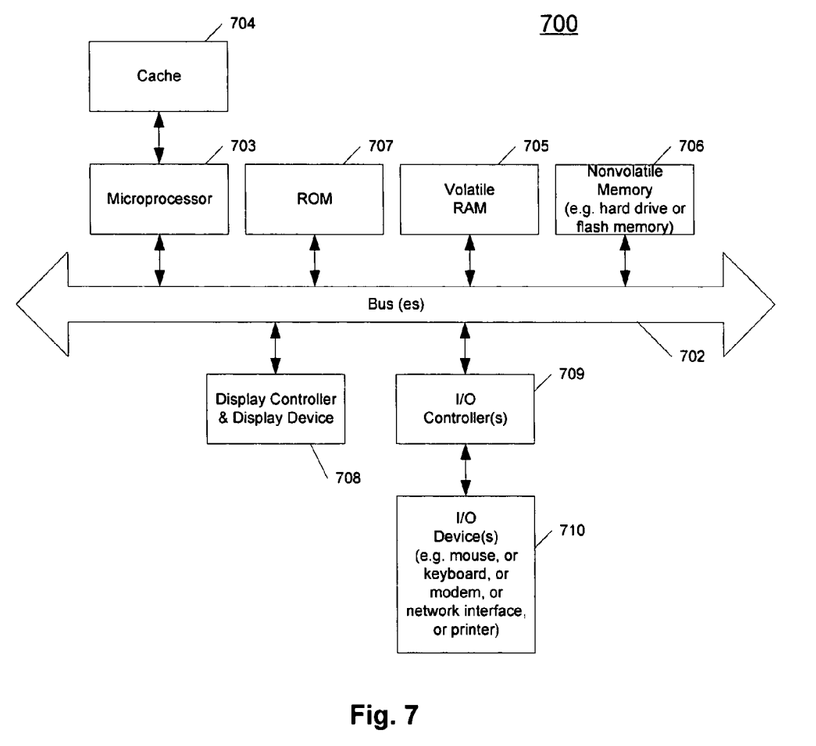
FIG. 7 illustrates one example of a typical data processing system such as a computer system, which may be used in conjunction with the embodiments described herein.

FIG. 7 shows one example of a data processing system such as a computer system, which may be used with one embodiment the present invention. For example, the system 700 may be implemented as a part of the system shown in FIGS. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 701, which is a form of a data processing system, includes a bus 703 which is coupled to a microprocessor(s) 705 and a ROM (Read Only Memory) 707 and volatile RAM 709 and a non-volatile memory 711. The microprocessor 703 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method comprises:
receiving, during run-time, a request from an application to perform a data transformation task, the request including a plurality of options to perform the data transformation task, the request including a plurality of request parameters specifying the options;
determining if an optimized compiled code to perform the data transformation task is available, the optimized compiled code optimized to perform the data transformation task according to the options of the request;
executing a non-optimized compiled code during the run-time to perform the data transformation task for the request if the optimized compiled code is not available; and
compiling, during the run-time, the optimized compiled code if the optimized compiled code is not available, the optimized compiled code optimized for the options of the request, the optimized compiled code to be executed to perform a future data transformation task for a future request,
wherein the compiling comprises:
identifying a request object in association with a request key that is based on the plurality of request parameters, and
inserting the request object to a work queue, the work queue including a plurality of request objects.

2. The method of claim 1, wherein the request key is represented via a binary state vector.

3. The method of claim 2, wherein the compiling the optimized compiled code and the executing the non-optimized compiled code are performed substantially concurrently by separate computing threads.

4. The method of claim 3, wherein the compiling the optimized compiled code is performed via a worker thread.

5. The method of claim 2, wherein a length of the vector indicates a number of possible run-time states of the application.

6. The method of claim 1, wherein the identifying comprises:
generating a hash value based on the request key;
searching for the request object based on the hash value; and
generating the request object, if the search fails to find the request object.

7. The computer implemented method of claim 1, wherein the inserting comprises:
determining if the request object is already in the work queue; and
removing an existing request object from the work queue.

8. The method of claim 1, wherein the executing the non-optimized compiled code comprises determining the request object is not in the work queue.

9. The method of claim 1, wherein the executing the optimized compiled code comprises retrieving, in response to a second request from the application, the optimized compiled code based on the request object.

10. The method of claim 1, wherein the data transformation task is a graphics rendering task.

11. A non-transitory machine-readable medium machine-readable medium having instructions stored therein, which when executed by a machine, cause the machine to perform a method, the method comprising:
receiving, during runtime, a request from an application to perform a data transformation task, the request including a plurality of options to perform the data transformation task, the request including a plurality of request parameters specifying the options;
determining if an optimized compiled code to perform the data transformation task is available, the optimized compiled code optimized to perform the data transformation task according to the options of the request;
executing a non-optimized compiled code during the run-time to perform the data transformation task for the request if the optimized compiled code is not available; and
compiling, during the run-time, the optimized compiled code if the optimized compiled code is not available, the optimized compiled code optimized for the options of the request, the optimized compiled code to be executed to perform a future data transformation task for a future request,
wherein the compilation comprises:
identifying a request object in association with a request key that is based on the plurality of request parameters, and
inserting the request object to a work queue, the work queue including a plurality of request objects.

12. The non-transitory machine-readable medium of claim 11, wherein the request key is represented via a binary state vector.

13. The non-transitory machine-readable medium of claim 12, wherein the compiling the optimized compiled code and the executing the non-optimized compiled code are performed substantially concurrently by separate computing threads.

14. The non-transitory machine-readable medium of claim 13, wherein the compiling the optimized compiled code is performed via a worker thread.

15. The non-transitory machine-readable medium of claim 12, wherein a length of the vector indicates a number of possible run-time states of the application.

16. The non-transitory machine-readable medium of claim 11, wherein the identifying comprises:
generating a hash value based on the request key;
searching for the request object based on the hash value; and generating the request object, if the search fails to find the request object.

17. The non-transitory machine-readable medium of claim 11, wherein the inserting comprises:
   determining if the request object is already in the work queue; and
   removing an existing request object from the work queue.

18. The non-transitory machine-readable medium of claim 11, wherein the executing the non-optimized compiled code comprises determining the request object is not in the work queue.

19. The non-transitory machine-readable medium of claim 11, wherein the executing the optimized compiled code comprises retrieving, in response to a second request from the application, the optimized compiled code based on the request object.

20. The non-transitory machine-readable medium of claim 11, wherein the data transformation task is a graphics rendering task.

21. An apparatus having a processor, comprising:
   means for receiving, during run-time, a request from an application to perform a data transformation task, the request including a plurality of options to perform the data transformation task, the request including a plurality of request parameters specifying the options;
   means for determining if an optimized compiled code to perform the data transformation task is available, the optimized compiled code optimized to perform the data transformation task according to the options of the request;
   means for executing a non-optimized compiled code during the run-time to perform the data transformation task for the request if the optimized compiled code is not available; and
   means for compiling, during the run-time, the optimized compiled code if the optimized compiled code is not available, the optimized compiled code optimized for the options of the request, the optimized compiled code to be executed to perform a future data transformation task for a future request,
   wherein the means for compiling comprises:
      means for identifying a request object in association with a request key that is based on the plurality of request parameters, and
      means for inserting the request object to a work queue including a plurality of request objects.

22. A hardware system comprising:
   a library interface module for determining, in response to a request from an application during run-time to perform a data transformation task, an optimized compiled code is available for the request, wherein the request includes a plurality of options to perform the data transformation task, the request including a plurality of request parameters specifying the options, the optimized compiled code optimized according to the options of the request to perform the data transformation task, wherein a run-time key for run-time optimization task is identified based on the request if the optimized compiled code is not available, the run-time optimization task to compile the optimized compiled code from a source code during the run-time;
   a static library module including a non-optimized compiled code for the source code, the non-optimized compiled code being executed to perform the data transformation task for the request during the run-time if the optimized compiled code is not available;
   a dynamic library module for storing the optimized compiled code for the source code;
   a task storage module for storing the run-time optimization task according to the run-time key;
   a work queue module to store a schedule of the run-time optimization task based on the request; and
   a run-time compiler module for performing the run-time optimization task to compile the optimized compiled code during the run-time according to the schedule,
   wherein the run-time optimization task comprises:
      identifying a request object in association with a request key that is based on the plurality of request parameters, and
      inserting the request object to a work queue including a plurality of request objects.

* * * * *